United States Patent
Ree et al.

(10) Patent No.: US 8,711,710 B2
(45) Date of Patent: Apr. 29, 2014

(54) SYSTEMS AND METHODS FOR ADAPTIVE ERROR THRESHOLDS OR ADAPTIVE MODULATION SCHEMES BASED ON ATMOSPHERIC CONDITIONS

(75) Inventors: Bradley Richard Ree, Cumming, GA (US); John Christopher Boot, Sandy Springs, GA (US)

(73) Assignee: General Electric Company, Schenectady, NY (US)

( * ) Notice: Subject to any disclaimer, the term of this patent is extended or adjusted under 35 U.S.C. 154(b) by 460 days.

(21) Appl. No.: 13/028,145

(22) Filed: Feb. 15, 2011

(65) Prior Publication Data

US 2012/0207028 A1 Aug. 16, 2012

(51) Int. Cl.
*H04L 12/26* (2006.01)
(52) U.S. Cl.
USPC ......... 370/242; 370/252; 370/338; 340/3.43; 455/13.4; 702/85; 702/182
(58) Field of Classification Search
None
See application file for complete search history.

(56) References Cited

U.S. PATENT DOCUMENTS

| 6,043,642 | A | * | 3/2000 | Martin et al. | 324/142 |
| 7,653,349 | B1 | * | 1/2010 | Patel | 455/13.4 |
| 2006/0184326 | A1 | * | 8/2006 | McNally et al. | 702/3 |
| 2009/0061779 | A1 | * | 3/2009 | Gurney et al. | 455/63.1 |
| 2009/0070038 | A1 | * | 3/2009 | Geelen et al. | 701/216 |
| 2009/0256686 | A1 | * | 10/2009 | Abbot et al. | 340/310.11 |

\* cited by examiner

*Primary Examiner* — Chi Pham
*Assistant Examiner* — Shick Hom
(74) *Attorney, Agent, or Firm* — Sutherland Asbill & Brennan LLP

(57) ABSTRACT

Systems and methods may be provided for adaptive communications with utility meters based on atmospheric conditions. The systems and methods may include obtaining weather information associated with a location of a utility meter; determining, based upon the weather information, whether the utility meter location is associated with weather that affects communications performance; and modifying an acceptable communications error rate associated with the utility meter or the communications interface of the utility meter from a first value to a second value upon determining that the utility meter location is associated with weather that affects communications performance. One or more of the foregoing operations may be performed by a utility meter or a utility server computer associated with the utility meter.

20 Claims, 5 Drawing Sheets

SYSTEMS AND METHODS FOR ADAPTIVE ERROR THRESHOLDS OR ADAPTIVE MODULATION SCHEMES BASED ON ATMOSPHERIC CONDITIONS

FIELD OF THE INVENTION

Embodiments of the invention relate generally to communications with utility meters, and more specifically to systems and methods for adaptive error thresholds or adaptive modulation schemes based on atmospheric conditions.

BACKGROUND OF THE INVENTION

Utility meters, such as electrical meters, are typically utilized at residences and businesses to monitor the provision of one or more utility services. Recently, a wide variety of different types of smart meters and advanced meters have been developed to facilitate the collection of additional consumption data and to facilitate various network communications between the meters and other entities, such as a utility company. Smart meters are utilized for a wide variety of purposes, such as for billing purposes, for power outage detection, for remote configuration or turning utility services on and off, and for many other services.

Communications with one or more smart meters in a network of smart meters may be impacted by atmospheric conditions. Accordingly, there is an opportunity in the industry for systems and methods for adaptive error thresholds or adaptive modulation schemes based on atmospheric conditions.

BRIEF DESCRIPTION OF THE INVENTION

Some or all of the above needs and/or problems may be addressed by certain embodiments of the invention. Embodiments of the invention may include systems and methods for adaptive error thresholds or adaptive modulation schemes based on atmospheric conditions. According to one embodiment of the invention, there is disclosed a system. The system may include at least one memory for storing computer-executable instructions, and at least one processor in communication with the at least one memory. The at least one processor is configured to execute the computer-executable instructions to: obtain weather information associated with a location of a utility meter; determine, based upon the weather information, whether the utility meter location is associated with weather that affects communications performance; and modify an acceptable communications error rate associated with the utility meter or the communications interface of the utility meter from a first value to a second value upon determining that the utility meter location is associated with weather that affects communications performance.

According to another embodiment of the invention, there is disclosed a method. The method may include determining, by a monitoring system comprising one or more computers, a location of a utility meter; obtaining, by the monitoring system, weather information associated with the location of the utility meter; determining, by the monitoring system based upon the weather information, whether the utility meter location is associated with weather that affects communications performance; and modifying, by the monitoring system, an acceptable communications error rate associated with the utility meter or communications interface of the utility meter from a first value to a second value upon determining that the utility meter location is associated with weather that affects communications performance.

Additional systems, methods, apparatuses, features, and aspects are realized through the techniques of various embodiments of the invention. Other embodiments and aspects of the invention are described in detail herein and are considered a part of the claimed invention. Other embodiments and aspects can be understood with reference to the description and the drawings.

BRIEF DESCRIPTION OF THE DRAWINGS

Figure 1:
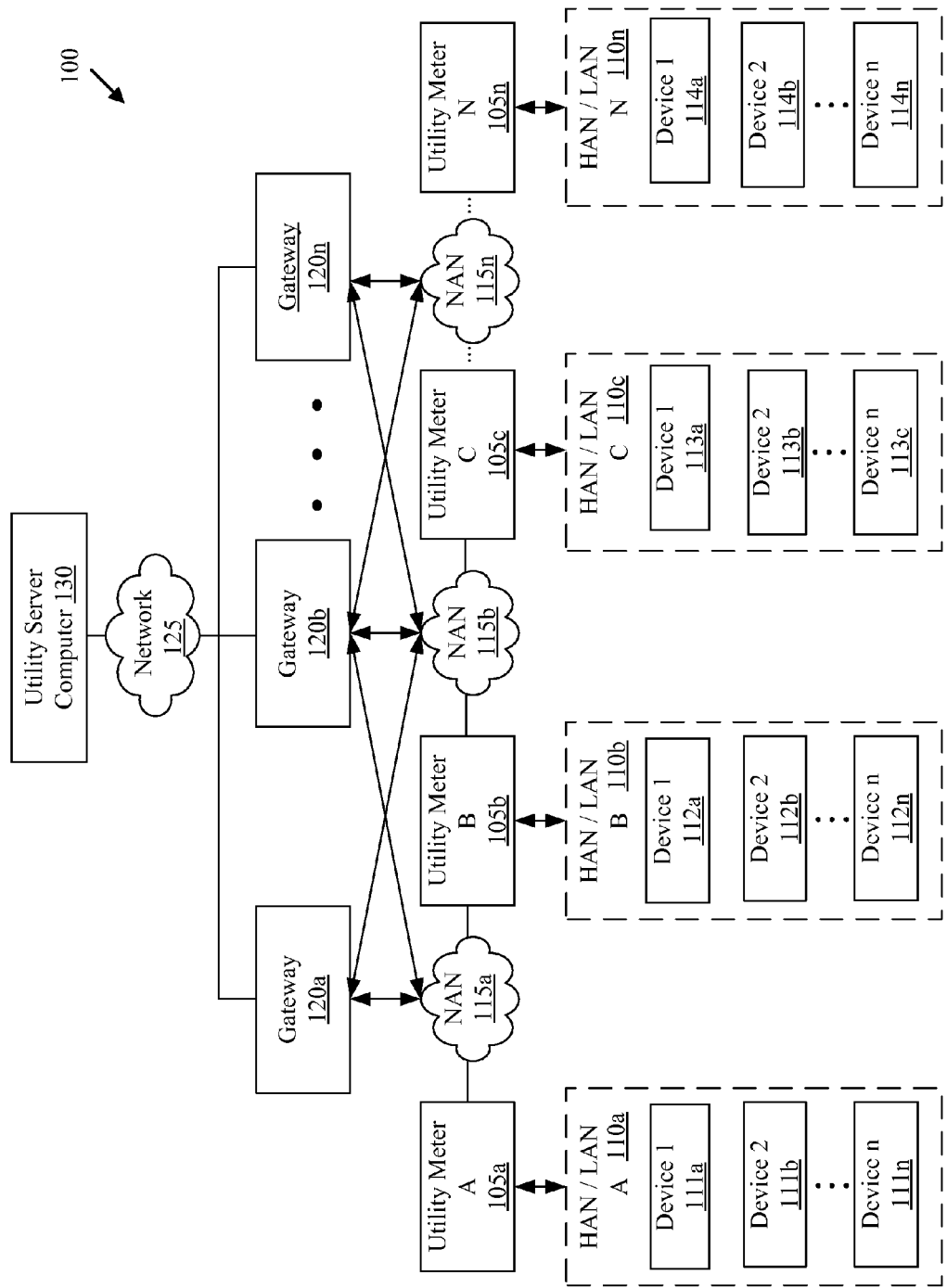

Having thus described the invention in general terms, reference will now be made to the accompanying drawings, which are not necessarily drawn to scale, and wherein:

FIG. 1 is a block diagram of one example monitoring system that supports adaptive error thresholds or adaptive modulation schemes based on atmospheric conditions, according to an illustrative embodiment of the invention.

Figure 2:
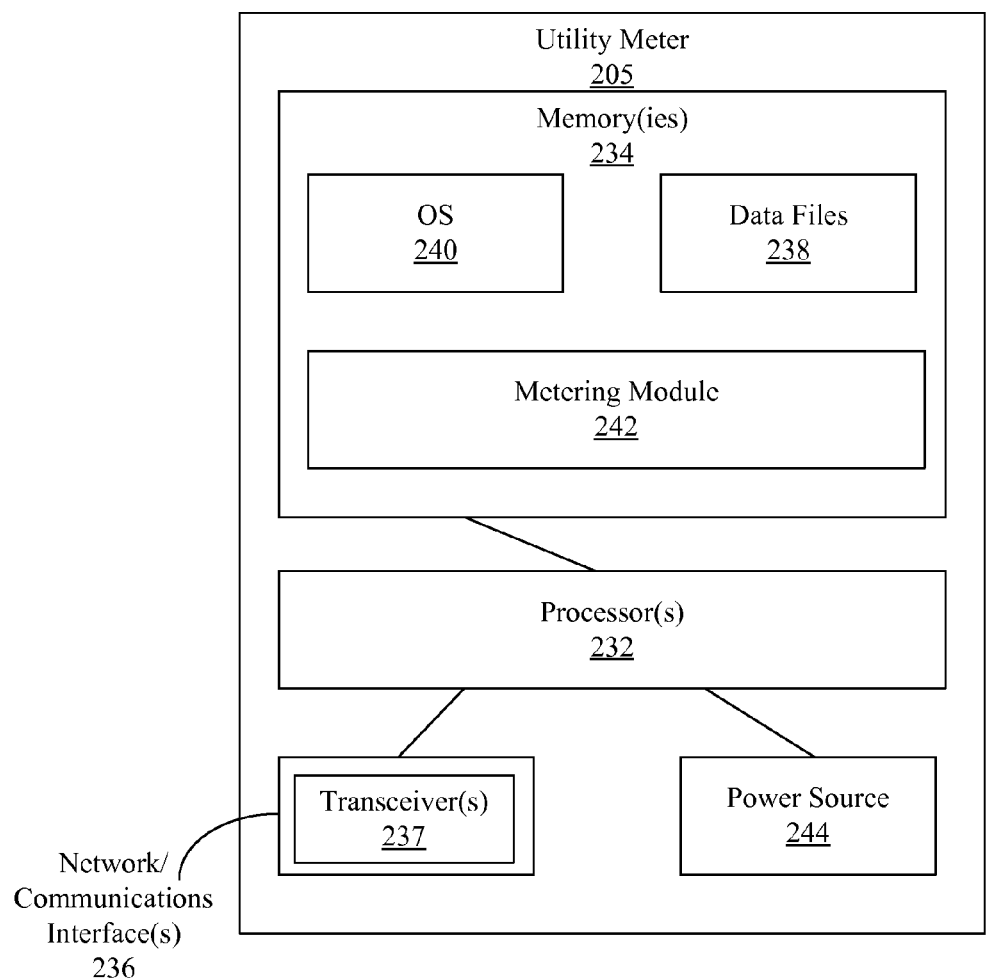

FIG. 2 illustrates an example utility meter, according to an example embodiment of the invention.

Figure 3:
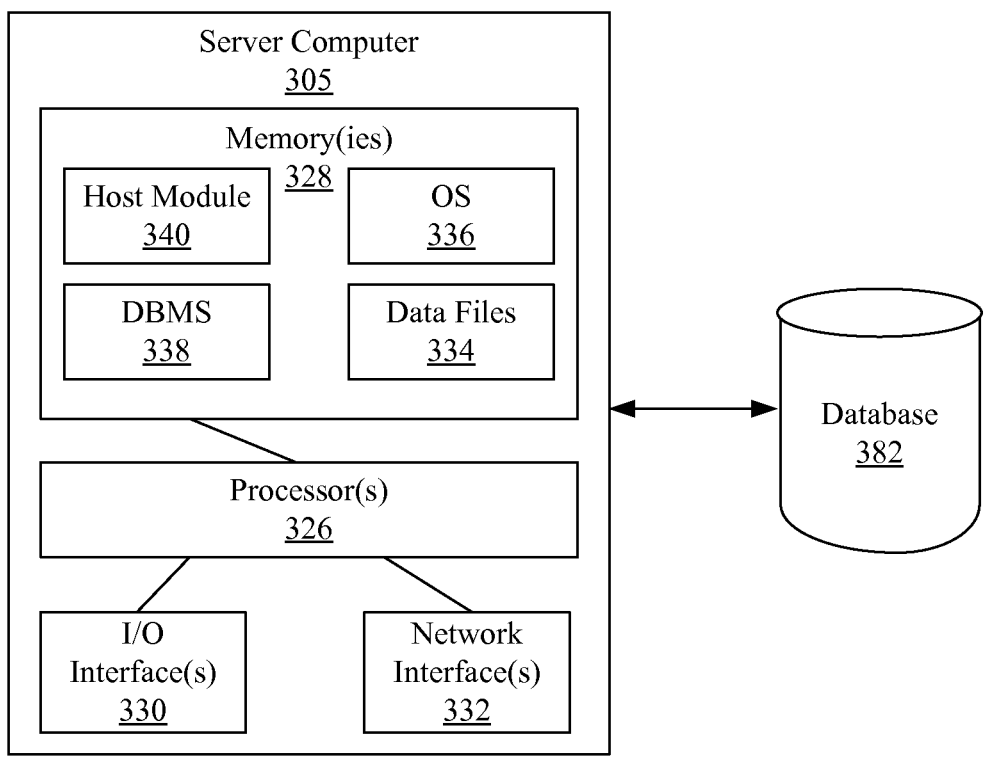

FIG. 3 illustrates an example server computer in accordance with an example embodiment of the invention.

Figure 4:
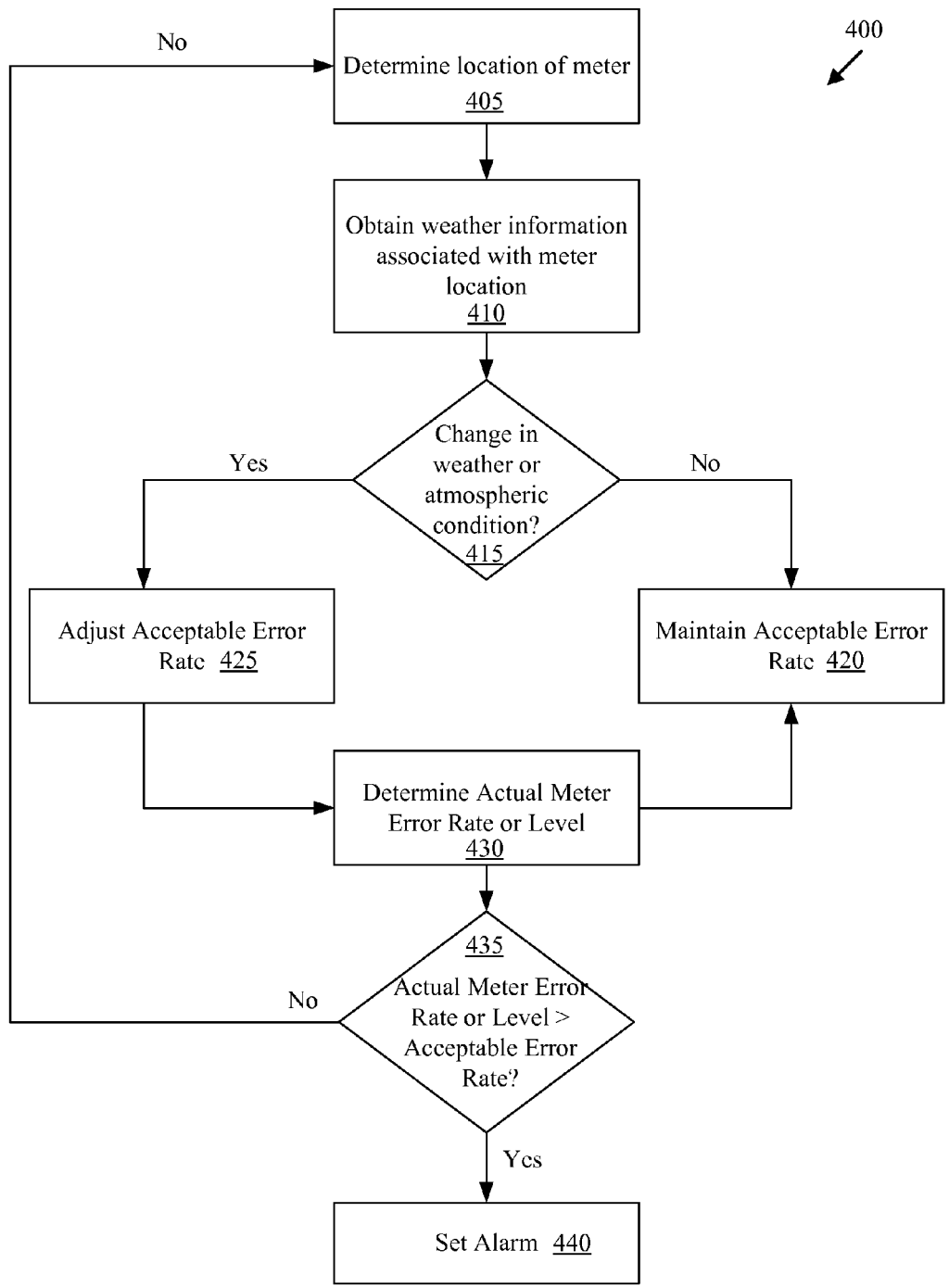

FIG. 4 is a flow diagram illustrating an example method for adaptive error thresholds based on atmospheric conditions, according to an example embodiment of the invention.

Figure 5:
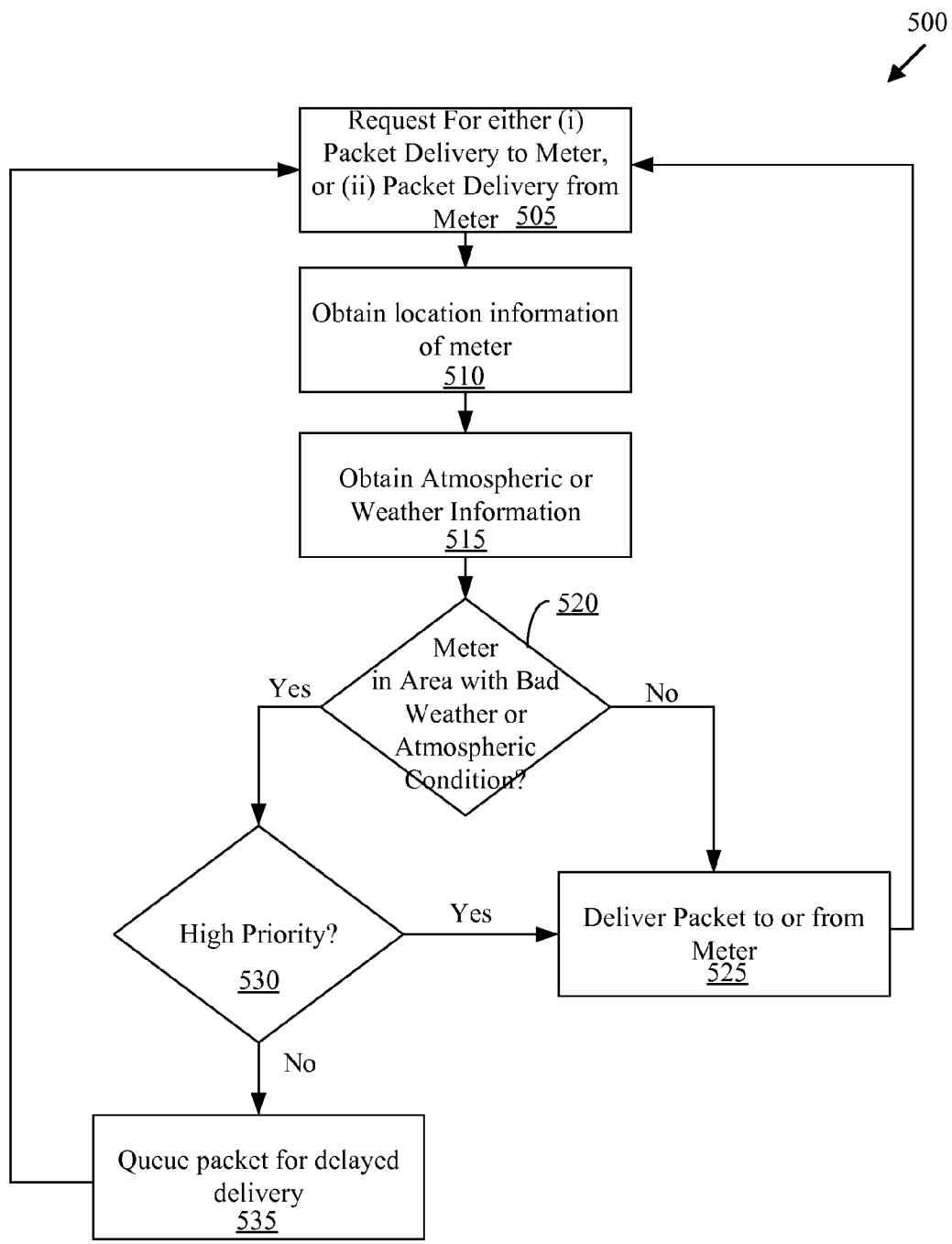

FIG. 5 is a flow diagram illustrating an example method for adjusting prioritizations for packets or frames based on atmospheric conditions, according to an example embodiment of the invention.

DETAILED DESCRIPTION OF THE INVENTION

Illustrative embodiments of the invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Disclosed are systems and methods for adaptive error thresholds or adaptive modulation schemes based on atmospheric conditions. The adaptive error thresholds or adaptive modulation schemes can be modified depending upon atmospheric conditions. Accordingly, embodiments of the invention can reduce communications errors and/or manage network communications, which may include wireless network communications, with a network of smart utility meters based upon transient atmospheric conditions.

Various embodiments of the invention may include one or more special purpose computers, systems, and/or particular machines that facilitate the network communications with one or more smart utility meters and/or other network devices. A special purpose computer or particular machine may include a wide variety of different software modules as desired in various embodiments. As explained in greater detail below, in certain embodiments, these various software components may be utilized to facilitate communications between one or more entities, including a utility company, and one or more smart utility meters. Additionally, these various software components may be utilized to support adaptive error thresholds or adaptive modulation schemes based on atmospheric conditions.

Certain embodiments of the invention described herein may have the technical effect of changing adaptive error thresholds or adaptive modulation schemes, which may impact the extent and type of communications between one or more entities and one or more smart utility meters. For example, the modification of an error threshold for packet error rate alarms can be adjusted based upon the atmospheric conditions that the meter is experiencing at the time of the measurement. As such, temporary weather-induced communications errors may not be sent to a network operator associated with a utility company. As another example, non-critical data transfers can be delayed while atmospheric conditions are affecting radio performance with one or more smart utility meters. Accordingly, time-critical messages may be given priority when the performance of the wireless network with one or more smart utility meters is low.

It will be appreciated that the adjustment of error thresholds or adaptive modulation schemes, as described herein, may reduce the number of false alarms that the operator of a utility network may otherwise receive when certain atmospheric conditions are present, according to an example embodiment of the invention. By reducing the number of false alarms, an operator may be better equipped to handle actual alarms identifying real issues, according to an example embodiment of the invention. These and other aspects of adjusting the error thresholds or adaptive modulation schemes will be appreciated by those of ordinary skill in the art.

FIG. 1 is a block diagram of one example monitoring system 100 that supports adaptive error thresholds or adaptive modulation schemes based on atmospheric conditions, according to an illustrative embodiment of the invention. The system 100 illustrated in FIG. 1 may include a plurality of smart utility meters 105a-n, according to an example embodiment of the invention. Each smart utility meter 105a-n may be in communication with one or more home area networks (HANs) or local area networks (LANs) 110a-n using wired communications (e.g., power line carrier communications, serial communications link, USB, Ethernet, fiber optic, etc.) or wireless communications (e.g., Zigbee, Global System for Mobile Communications (GSM), Wi-Fi, Worldwide Interoperability for Microwave Access (WiMAX), General Packet Radio Service (GPRS), Bluetooth, cellular, 3G, 4G, 802.11x, radio frequency (RF) mesh communications, etc.). Where a LAN is associated with one or more customer homes, the LAN may be referred to as a HAN. For convenience, the example HAN/LAN 110a-n described herein will be understood to encompass either or both a HAN or a LAN.

Each HAN/LAN 110a-n may include or be in communication with one or more network devices, which may include one or more home devices such as lights, appliances (e.g., refrigerator, stove, oven, dishwasher, clothes washer, clothes dryer, coffee maker, etc.), televisions, security systems, air conditioning and/or heating units, home Internet modems and routers, and the like, according to an example embodiment of the invention. For example, utility meter 105a can communicate with one or more network devices 111a-n via HAN/LAN 110a. Likewise, utility meter 105b can communicate with one or more network devices 112a-n via HAN/LAN 110b. Utility meter 105c can communicate with one or more network devices 113a-n via HAN/LAN 110c. Similarly, utility meter 105n can communicate with one or more network devices 114a-n via HAN/LAN 110n. It will be appreciated that one or more of the network devices 111a-n, 112a-n, 113a-n, 114a-n may receive a metered commodity (e.g., electricity, water, gas, etc.) via a respective utility meter 105a-n.

In addition, each smart utility meter 105a-n may be in further communication with one or more neighborhood area networks (NANs) 115a-n via wired or wireless communications similar to those described herein. These NANs 115a-n may provide further connectivity to other NANs and wide area networks (WANs) 125 (e.g., the Internet, a cellular network, a satellite-based network, etc.) via one or more gateway computers 120a-n. These NANs 115a-n and/or WANs 125 can enable communications between or among utility meters 105a-n, utility server computers 130, and/or one or more other computers associated with a utility company. It will be appreciated that the NANs 115 and/or WAN 125 can be provided or accessed via wired and/or wireless communications, and collectively create an interconnected network. For example, a utility meter 105a-n can communicate with a utility server computer 130 via a gateway computer 120a-n and/or WAN 125. It will be appreciated that in some example embodiments, the WAN 125, gateway computers 120a-n, and the NANs 115a-n may be part of a same network such as the Internet. In an example embodiment of the invention, the utility meter 105a-n may also be in communication with a WAN 125 or other yet networks without an intermediate NAN 115a-n.

Many different communication paths between network devices may be available via the various combinations of HANs/LANs 110a-n, NANs 115a-n, gateway computers 120a-n, and WAN 125. For example, utility server computer 130 or other computers/processors associated with the utility company or another entity may communicate with various utility meters 105a-n through direct or indirect routes involving various combinations of WAN 125, gateway computers 120a-n, and other utility meters 105a-n. For example, utility server computer 130 could communicate with utility meter 105b, HAN/LAN 110b, and/or any network devices 112a-n associated with HAN/LAN 110b using any combination of WAN 125, gateway computers 120a-n, and any other utility meters 105a, 105c, and/or 105n. Accordingly, in some example embodiments of the invention, utility meters 105a-n and HANs/LANs 110a-n can communicate with other network devices in performing certain routing or retransmission functionality, according to an example embodiment of the invention.

A utility meter 105a-n may be any suitable utility meter that may be connected to a commodity metering and distribution system, such as an electrical meter connected to a power distribution grid that includes any number of power lines. A wide variety of suitable electrical meters may be utilized as desired in various embodiments, such as a single phase meter or a three-phase meter. A utility meter 105a-n may be configured to measure an amount of electrical energy (e.g., kilowatt hours, etc.) or electrical power that is supplied to an associated location, residence, business, household, or machine. In an alternative embodiment of the invention, the utility meter 105a-n can also be associated with the metering and distribution of commodities other than electricity such as water, gas, and the like. Thus, the utility meter 105a-n may be configured to meter and supply or distribute commodities to an associated location, residence, business, household, or machine, including an associated network device 111a-n, 112a-n, 113a-n, 114a-n.

In certain embodiments, the utility meter 105a-n may be a smart meter or an advanced meter that is configured to identify commodity consumption in relatively greater detail than a conventional meter. For example, a smart utility meter 105a-n may facilitate real-time or near real-time readings, commodity outage notifications, and/or commodity quality monitoring. Additionally, as desired, a smart utility meter 105a-n may communicate measurements data, calculations, and/or other information to one or more recipients, such as a utility server computer 130 of a utility company or a smart meter data processing system.

As desired, embodiments of the invention may include a system 100 with more or less than the components illustrated in FIG. 1. Additionally, certain components of the system 100 may be combined or omitted in various embodiments of the invention. The system 100 of FIG. 1 is provided by way of example only, as appreciated by those of ordinary skill in the art.

FIG. 2 illustrates an example utility meter 205, according to an example embodiment of the invention. The utility meter 205 of FIG. 2 may be an example implementation of any one of the utility meters 105a-n of FIG. 1. As shown in FIG. 2, an example utility meter 205 may include any number of suitable computer processing components that facilitate the operation of the utility meter and/or the provision of a utility service and/or commodity (e.g., electricity, water, gas, etc.) to a location, including a customer home location. Examples of suitable processing devices that may be incorporated into a utility meter 205 include, but are not limited to, application-specific circuits, microcontrollers, minicomputers, other computing devices, and the like. As such, a utility meter 205 may include any number of processors 232 that facilitate the execution of computer-readable instructions. By executing computer-readable instructions, the utility meter 205 may include or form a special purpose computer or particular machine that facilitates the provision of a utility service and/or the provision of a commodity to a location.

In addition to one or more processor(s) 232, the utility meter 205 may include one or more memory devices 234 and/or one or more network and/or communications interfaces 236. The one or more memory devices 234 or memories may include any suitable memory devices, for example, caches, read-only memory devices, random access memory devices, magnetic storage devices, etc. The one or more memory devices 234 may store data, executable instructions, and/or various program modules utilized by the utility meter 205, for example, data files 238, an operating system ("OS") 240, and/or a metering module 242. The data files 238 may include, for example, stored data associated with the operation of a utility meter 205, stored data associated with measurements and/or readings taken by the utility meter 205, utility meter configuration information, stored messages and/or alerts, and/or stored commodity management, usage, and/or distribution data. The OS 240 may include executable instructions and/or program modules that facilitate and/or control the general operation of the utility meter 205. For example, the OS 240 may facilitate the execution of other software programs and/or program modules by the processors 232. The metering module 242 may be configured to determine and record, perhaps in data files 238 or other data storage, commodity usage or distribution to an associated location, residence, business, household, or machine, including an associated network device 111a-n, 112a-n, 113a-n, 114a-n.

The one or more network interfaces 236 associated with the utility meter 205 can include a HAN/LAN interface and a NAN interface. The LAN interface can be used for communicating or connecting with one or more HANs/LANs such as HANs/LANs 110a-n of FIG. 1, and the NAN interface can be used for communicating or connecting with one or more NANs such as NANs 115a-n of FIG. 1. In this regard, a utility meter 205 may receive data from and/or communicate data to other components of the system 100. The one or more network interfaces 236, including the HAN/LAN interface and/or the NAN interface, can be implemented as one or more network cards, adaptors, or transceivers 237 for communicating over wired interfaces (e.g., power line carrier communications, serial communications link, USB, Ethernet, fiber optic, etc.) and/or wireless interfaces (e.g., ZigBee, GSM, Wi-Fi, WiMAX, Bluetooth, GRPS, cellular, 3G, 4G, 802.11x, RF mesh communications, etc.). It will be appreciated that the one or more network interfaces 236 can also be utilized for communicating or connecting with one or more other network devices or networks, including WAN 125 of FIG. 1, without departing from example embodiments of the invention.

The utility meter 205 may typically receive a commodity from a connected commodity line, grid and/or source, and likewise meter and distribute the commodity to an associated location, residence, business, household, or machine, including an associated network device 111a-n, 112a-n, 113a-n, 114a-n. Additionally, as desired in certain embodiments, the utility meter 205 may include any number of suitable power sources 244, which can include wired power supplies, and solar power cells, as well as back-up power supplies such as one or more batteries, fuel cells, or one or more super capacitors.

FIG. 3 illustrates an example server computer 305 in accordance with an example embodiment of the invention. The server computer 305 can be an implementation of the utility server computer 130 of FIG. 1 or another computer or processor capable of communicating with any of the utility meters 105a-n of FIG. 1. The server computer 305 can be maintained by a utility company or a management company associated with the utility company. The server computer 305 can be configured for communicating with or configuring components of the system 100 of FIG. 1, including the utility meters 105a-n, or the HANs/LANs 110a-n or the associated network devices (e.g., devices 111a-n, 112a-n, 113a-n, 114a-n, etc.). For example, the server computer 305 may be configured to receive commodity usage information from utility meters 105a-n. The server computer 305 may also be configured to provide or direct another computer/processor to provide instructions to one or more network devices of HANs/LANs 110a-n, such as to turn a particular network device off or on.

The server computer 305 may include, but is not limited to, any processor-driven device. The server computer 305 may include, but is not limited to, one or more server computers, mainframe computers, networked computers, or any other processor-based device. The server computer 305 may include one or more processor(s) 326, memories 328, input/output ("I/O") interface(s) 330, and network interface(s) 332. The one or more memories 328 may be any computer-readable medium, coupled to the processor(s) 326, such as RAM, ROM, and/or a removable storage device for storing data files 334 and a database management system ("DBMS") 338 to facilitate management of data files 334 and other data stored in the memory 328 and/or stored in one or more databases 382. The memory 328 may also store various program modules such as an operating system ("OS") 336, and the host module 340. The OS 336 may be, but is not limited to, Microsoft Windows®, Apple OSX™, Linux, Unix, or a mainframe operating system.

The data files 334 may also store information received from or to be provided to one or more components of the system 100 of FIG. 1. For example, the data files 334 may store commodity usage information from utility meters 105a-n, configuration information for utility meters 105a-n, or operation instructions for one or more network devices associated with HANs/LANs 110a-n. The data files 334 may also store weather or atmospheric information, which may be obtained from one or more utility meters, or a weather monitoring database or service. The data files 334 can also store information regarding one or more modulation schemes available for communicating with one or more utility meters 105*a*-*n*. Additional information may also be stored in data files 334 to support adaptive error thresholds or adaptive modulation schemes, as described herein.

The host module 340 may receive, process, and respond to requests from various components of the system 100, including the utility meters 105*a*-*n*, or the HANs/LANs 110*a*-*n* or the associated network devices (e.g., devices 111*a*-*n*, 112*a*-*n*, 113*a*-*n*, 114*a*-*n*, etc.). The database 382 may comprise one or more databases operable for storing information that supports adaptive error thresholds or adaptive modulation schemes in accordance with an example embodiment of the invention. For example, the database 382 may store any of the information previously discussed with respect to data files 334. The database 382 can also store location information associated with one or more utility meters 105*a*-*n*. The database 382 can also store status information and atmospheric/weather information for prior time periods and/or a current time period that may be associated with a utility meter 105*a*-*n*, according to an example embodiment of the invention. Many other types of information can be stored and accessed from database 382 without departing from example embodiments of the invention. Database 382 may be a local database or a network database, including an Internet-accessible database, without departing from example embodiments of the invention.

FIG. 4 is a flow diagram illustrating an example method 400 for adaptive error thresholds based on atmospheric conditions, according to an example embodiment of the invention. In certain embodiments, one or more operations of the method 400 may be performed by a monitoring system comprising one or more utility server computers 130 of FIG. 1 or other computers/processors associated with a utility company. In an alternative embodiment, one or more operations of the method 400 may also be performed by a utility meter 105*a*-*n*.

Turning now to FIG. 4, at block 405, the location of one of the utility meters 105*a*-*n* may be determined. The location of a particular utility meter 105*a*-*n* may be based upon a street address, city, or zip code that designates where the utility meter 105*a*-*n* is located. Alternatively, the utility server computer 130 may determine the location of the utility meter 105*a*-*n* from global positioning system (GPS) coordinates or in relation to other known utility meters located in proximity of or in communication with the utility meter. The utility server computer 130 may retrieve an address, city, zip code, GPS coordinate, or other location information associated with the utility meter 105*a*-*n* from a database 382 or other storage device. Alternatively, if the operations of the method 400 are being performed by a utility meter 105*a*-*n*, then block 405 may not necessarily need to be performed since a utility meter 105*a*-*n* may know its own location.

Following block 405 is block 410. Block 410 may include obtaining or determining an atmospheric condition or weather information associated with the location of the utility meter 105*a*-*n*. The atmospheric condition or weather information can be provided by or transmitted from the utility meter itself to the monitoring system comprising one or more utility server computers 130 or other computers/processors associated with a utility company. Alternatively, the atmospheric condition or weather information for a utility meter location can be obtained from one or more other utility meters 105*a*-*n* located in proximity to the particular utility meter 105*a*-*n*. In yet another alternative, the atmospheric condition or weather information for a utility meter location can be determined from a weather monitoring database or service accessible by the monitoring system. Many variations of determining the atmospheric condition or weather information at block 410 for a particular utility meter location are available without departing from example embodiments of the invention. Alternatively, if the operations of the method 400 are being performed by a utility meter 105*a*-*n*, then the atmospheric condition or weather information can be obtained directly from other utility meters, or from a weather monitoring database or service accessible to the utility meter 105*a*-*n* via its communications interface (e.g., to a NAN, WAN, or LAN/HAN, etc.).

Following block 410 is block 415. Block 415 determines whether there is a change in atmospheric conditions or weather at the utility meter location that would affect communications performance with the utility meter. If there is no change in atmospheric conditions or weather that would affect communications performance, then processing may proceed to block 420, where the acceptable error rate may be maintained at a current value. On the other hand, if there is indeed a change in atmospheric conditions that would affect communications performance, then processing may proceed to block 425, where the acceptable error rate may be adjusted. It will be appreciated that the acceptable error rate may be adjusted depending upon whether the change in weather favorably or negatively affects communications performance with a utility meter 105*a*-*n*. If the change in weather favorably affects communications performance, then the acceptable error rate may be decreased, returned to a first default value, or otherwise set to a value that is less tolerant of communication errors due to improved weather or atmospheric conditions. An example of a change in weather that favorably affects communications performance is, for example, when rain, thunderstorm, or snow storm, moves out of a utility meter location. On the other hand, if the change in weather negatively affects communications performance, then the acceptable error rate may be increased, returned to a second default value, or otherwise set to a value that is more tolerant of communications errors due to worsening weather or atmospheric conditions. An example of a change in weather that negatively affects communications performance is, for example, when rain, thunderstorm, or snow storm, moves into a utility meter location. It will be appreciated that the acceptable error rate may be a threshold for determining whether one or more alarms are triggered indicating communications problems with the utility meter 105*a*-*n*. An acceptable error rate may be maintained by the monitoring system for each utility meter 105*a*-*n* or communications interface associated therewith.

Block 430 is reached from either blocks 420 or 425, where the acceptable error rate is either maintained or adjusted if necessary. At block 430, the actual meter error level or rate associated with the utility meter 105*a*-*n* or the communications interface (e.g., interface 236) of the utility meter 105*a*-*n* may be determined.

Following block 430 is block 435. Block 435 may include comparing the actual communications error level rate to the acceptable communications error rate to determine whether to indicate an alarm condition for the utility meter 105*a*-*n*. As an example, if the actual meter error rate is greater than or exceeds the acceptable error rate, then processing may proceed to block 440, where an alarm is set or triggered for the utility meter 105*a*-*n*. If an alarm is set or triggered, it can likewise result in the utility meter 105*a*-*n*, the utility server computer 130, or another computer/processor of the monitoring system taking one or more actions or directing another computer to take one or more actions. Example actions can include delaying or stopping communications to the affected utility meter 105*a*-*n* or directing the dispatch of personnel to the affected utility meter. Alternatively, if the operations of the method 400 are being performed by a utility meter 105*a-n*, then an example action can include delaying the transmission of information from the affected utility meter 105*a-n*, or generating and transmitting an alarm or error message from the affected utility meter 105*a-n* to the utility server computer 130, or another computer/processor of the monitoring system. Otherwise if the actual meter level is not greater than or does not exceed the acceptable error rate, then processing may return to block 405, where the process may be repeated as described above for another utility meter location.

It will be appreciated that in block 435, the actual meter error rate or level may be determined to be in similar units as the acceptable error rate so that the comparison can be made. However, the actual meter error rate or level and/or the acceptable error rate can be converted to similar units of measure without departing from example embodiments of the invention. One or both of the actual meter error rate/level and the acceptable error rate may be associated with one or more metrics, rates, or levels corresponding to: (i) an extent of packet losses, (ii) an extent of retransmissions, (iii) an amount of correctable bit errors, or (iv) an amount of checksum errors. For example, a packet loss error rate may indicate the number or extent of packets transmitted to, but not received by, a utility meter or the communications interface of the utility meter. Likewise, retransmission rate may be associated with the extent (e.g., number, percentage, etc.) of packet or frame retransmissions to a utility meter 105*a-n* or communications interface of the utility meter 105*a-n*. The correctable bit error rate may be reported by or obtained from the utility meter 105*a-n* or communications interface of the utility meter 105*a-n* to indicate the extent to which packets are received with errors and can be corrected. The checksum error rate may be reported by or obtained from the utility meter or communications interface of the utility meter to indicate the extent to which packets are received with errors in the checksum. Other types of error rates or levels can be utilized without departing from example embodiments of the invention.

It will be appreciated that many variations of the flow diagram of FIG. 4 are available in accordance with example embodiments of the invention. For example, instead of modifying the acceptable error rate, the modulation scheme used to communicate with a utility meter can instead be modified. For example, if block 415 were to determine a change in atmospheric conditions that affects communications performance with the utility meter, then the modulation scheme for communications can be changed from a first modulation scheme to a second modulation scheme. For example, a first modulation scheme can be QAM-256 (or QPSK-256) while the second modulation scheme can be QAM-16 or QAM 64 (or QPSK-16 or -64), according to an example embodiment of the invention. The change from a first modulation scheme to a second modulation scheme can reduce the transmitted information size (e.g., packet, frame, etc.) as needed to reduce network congestion or the network load, or alternatively, to increase the transmitted information size to enhance error correction or detection capabilities.

FIG. 5 is a flow diagram illustrating an example method 500 for adjusting prioritizations for packets or frames based on atmospheric conditions, according to an example embodiment of the invention. In certain embodiments, the operations of the method 500 may be performed by a monitoring system comprising one or more utility server computers 130 of FIG. 1 or other computers/processors associated with a utility company. In an alternative embodiment, one or more operations of the method 500 may also be performed by the utility meter 105*a-n*.

Turning now to FIG. 5, at block 505, there may be a request or need for packet, frame, or information delivery to a utility meter such as one of utility meters 105*a-n* in FIG. 1. For example, one or more utility server computers 130 or another computer/processor associated with a utility company may need to deliver a time-critical data or a non-critical data to a utility meter 105*a-n*. Alternatively, if the operations of the method 500 are being performed by a utility meter 105*a-n*, then at block 505, there may be a packet, frame, or information delivery from a utility meter 105*a-n*, according to an example embodiment of the invention.

Following block 505 is block 510. At block 510, the location of one of the utility meters 105*a-n* may be determined. The location of the utility meter 105*a-n* may be based upon a street address, city, or zip code that designates where the utility meter 105*a-n* is located. Alternatively, the utility server computer 130 may determine the location of the utility meter from global positioning system (GPS) coordinates or in relation to other known utility meters located in proximity of or in communication with the utility meter 105*a-n*. The utility server computer 130 may retrieve an address, city, zip code, GPS coordinate, or other location information associated with the utility meter 105*a-n* from a database 382 or other storage device. Alternatively, if the operations of the method 500 are being performed by a utility meter 105*a-n*, then block 510 may not necessarily need to be performed since a utility meter 105*a-n* may know its own location.

Following block 510 is block 515. Block 515 may include obtaining or determining an atmospheric condition or weather information associated with the location of the utility meter 105*a-n* (or communications interface thereof such as interface 236). The atmospheric condition or weather information can be provided by or transmitted from the utility meter 105*a-n* itself to the monitoring system comprising one or more utility server computers 130 or other computers/processors associated with a utility company. Alternatively, the atmospheric condition or weather information for a utility meter location can be obtained from one or more other utility meters 105*a-n* located in proximity to the particular utility meter 105*a-n*. In yet another alternative, the atmospheric condition or weather information for a utility meter location can be determined from a weather monitoring database or service accessible by the monitoring system. Many variations of determining the atmospheric condition or weather information at block 515 for a particular utility meter location are available without departing from example embodiments of the invention. Alternatively, if the operations of the method 500 are being performed by a utility meter 105*a-n*, then the atmospheric condition or weather information can be obtained directly from other utility meters, or from a weather monitoring database or service accessible to the utility meter 105*a-n* via its communications interface (e.g., to a NAN, WAN, or LAN/HAN, etc.).

Block 520 may determine whether the obtained atmospheric condition or weather information indicates bad weather for the utility meter location or weather that would negatively affect communications performance with the utility meter (or communications interface thereof). Alternatively, block 520 may determine whether the obtained atmospheric condition or weather information indicates an atmospheric condition that would negatively affect communications performance with the utility meter 105*a-n* (or communications interface thereof).

If block 520 determines that there is no weather or atmospheric condition that would negatively affect communications performance to or from the utility meter 105*a-n* (or communications interface thereof), then there may be no change to any prioritization of packet, frame, or information delivery to or from the utility meter 105*a-n* (or communications interface thereof), and processing may proceed to block 525. At block 525, the packet, frame, or other information may be delivered or directed for delivery to the utility meter 105*a-n* (or communications interface thereof) by one or more utility server computers 130 or other computers/processors associated with a utility company. For example, the utility server computer 130 may transmit the packet, frame, or other information, or it may direct or enable another computer/processor associated with the utility company to transmit the packet, frame, or other information. Alternatively, if the operations of the method 500 are being performed by a utility meter 105*a-n*, then the packet, frame, or other information may be delivered or directed for delivery from the utility meter 105*a-n* (or communications interface thereof) to a destination such as a utility server computer 130 or any other computer/processor associated with a utility company.

On the other hand, block 520 may determine that there is weather or an atmospheric condition that would negatively affect communications performance to or from the utility meter, and processing may proceed to block 530. Block 530 may determine whether the packet, frame, or information to be delivered to or from the utility meter 105*a-n* (or communications interface thereof) is high priority. For example, the source or destination address or another field of the packet, frame, or information may be indicative of or provide a designation or other identifier that indicates that the packet, frame, or information is high-priority or time-critical. If block 530 determines that the packet, frame, or information is high priority or time-critical, then processing may proceed to block 525, where the utility server computer 130 may transmit the packet, frame, or other information, or the utility server computer 130 may direct or enable another computer/processor associated with the utility company to transmit the packet, frame, or other information. Alternatively, if the operations of the method 500 are being performed by a utility meter 105*a-n*, then at block 525, the packet, frame, or other information may be delivered or directed for delivery from the utility meter 105*a-n* (or communications interface thereof) to a destination such as a utility server computer 130 or any other computer/processor associated with a utility company. In addition, it will be appreciated that the modulation scheme may be changed from a first modulation scheme to a second modulation scheme to ensure that the packet, frame, or other information is successfully received by or transmitted from the utility meter 105*a-n* (or communications interface thereof). Alternatively, the modulation scheme may be changed from a first modulation scheme to a second modulation scheme to reduce the network burden when the packet, frame, or other information is transmitted to the utility meter 105*a-n* (or communications interface thereof). For example, QAM-256 utilizes additional data to modulate the transmitted information, while QAM-16 utilizes less data to modulate the same transmitted information. However, QAM-256 enables better data recovery and correction compared to QAM-16 since QAM-256 utilizes more symbols than QAM-16.

On the other hand, block 530 may determine that the packet, frame, or information is not high priority or time-critical, and processing may proceed to block 535. At block 535, the packet, frame, or other information may be queued for later delivery when atmospheric conditions or weather improves or no longer negatively affects communications performance with the utility meter 105*a-n*. For example, the utility server computer 130 may designate the packet, frame, or other information as lower priority or non-time critical, or it may direct or enable another computer/processor to designate the packet, frame, or other information as lower priority or non-time critical. Accordingly, the lower priority or non-time critical packet, frame, or other information may remain in queue until the weather or atmospheric conditions improve or until the priority of the packet, frame, or other information is increased. Similarly, if the operations of the method 500 are being performed by a utility meter 105*a-n*, then the lower priority or non-time critical packet, frame, or other information may remain in queue for transmission from the utility meter 105*a-n* until the weather or atmospheric conditions improve or until the priority of the packet, frame, or other information is increased.

It will be appreciated that block 530 may act as a filter to restrict or limit transmissions to higher priority packets, frames, or other information. However, many variations of block 530 are available in accordance with example embodiments of the invention. For example, block 530 may be modified to specify additional levels of priority such as low-priority, medium priority, and high priority, with respective actions to be taken depending upon the determined priority.

The operations described and shown in the methods 400, 500 of FIGS. 4 and 5 may be carried out or performed in any suitable order as desired in various embodiments of the invention. Additionally, in certain embodiments, at least a portion of the operations may be combined or carried out in parallel. Furthermore, in certain embodiments, less than or more than the operations described in FIGS. 4 and 5 may be performed. As desired, the operations set forth in the methods 400 and 500 may be performed in a loop for continuous monitoring.

The invention is described above with reference to block and flow diagrams of systems, methods, apparatuses, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special purpose hardware and computer instructions.

While the invention has been described in connection with what is presently considered to be the most practical and various embodiments, it is to be understood that the invention is not to be limited to the disclosed embodiments, but on the contrary, is intended to cover various modifications and equivalent arrangements included within the spirit and scope of the appended claims.

This written description uses examples to disclose the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
at least one memory for storing computer-executable instructions; and
at least one processor in communication with the at least one memory, wherein the at least one processor is configured to execute the computer-executable instructions to:
obtain weather information associated with a location of a utility meter, wherein the weather information comprises at least one atmospheric condition;
determine, based upon the weather information, whether the utility meter location is associated with weather that affects communications performance; and
modify an acceptable communications error rate associated with the utility meter or the communications interface of the utility meter from a first value to a second value upon determining that the utility meter location is associated with weather that affects communications performance, wherein the acceptable communications error rate is modified by either (i) increasing the first value to the second value, or (ii) decreasing the first value to the second value.

2. The system of claim 1, wherein the at least one processor is configured to execute the computer-executable instructions to:
determine an actual communications error rate associated with the utility meter or the communications interface of the utility meter; and
compare the actual communications error rate to the acceptable communications error rate to determine whether to indicate an alarm condition for the utility meter.

3. The system of claim 2, wherein the actual communications error rate is compared to the acceptable communications rate by determining whether the actual communications error rate exceeds the acceptable communications rate.

4. The system of claim 1, wherein the communications error rate is associated with one or more metrics corresponding to: (i) packet loss, (ii) retransmissions, (iii) correctable bit errors, or (iv) checksum errors.

5. The system of claim 4, wherein the packet loss error rate is associated with wireless communications with the utility meter or the communications interface of the utility meter.

6. The system of claim 1, wherein if the weather negatively affects communications performance, then the acceptable communications error rate is increased from the first value to the second value, and
wherein if the weather positively affects communications performance, then the acceptable communications error rate is decreased from the first value to the second value.

7. The system of claim 1, wherein if the weather negatively affects communications performance, the at least one processor is configured to execute the computer-executable instructions to either: (i) restrict communications with the utility meter to higher priority communications, or (ii) direct another processor or communications device to restrict communications with the utility meter to higher priority communications.

8. The system of claim 7, wherein if the weather negatively affects communications performance, the at least one processor is configured to execute the computer-executable instructions to:
queue lower priority communications for delayed delivery to the utility meter or the communications interface of the utility meter.

9. The system of claim 1, wherein if the weather negatively affects communications performance, the at least one processor is further configured to:
change from a first modulation method to a second modulation method for communications with the utility meter or the communications interface of the utility meter.

10. The system of claim 1, wherein the utility meter is a first utility meter, wherein the weather information is obtained from one or more of: (i) the first utility meter, (ii) a weather monitoring database or service, or (iii) one or more second utility meters located in proximity to the first utility meter.

11. The system of claim 1, wherein the at least one memory and the at least one processor is part of (i) the utility meter, or (ii) a utility server computer associated with the utility meter.

12. A method, comprising:
determining, by a monitoring system comprising one or more computers, a location of a utility meter;
obtaining, by the monitoring system, weather information associated with the location of the utility meter, wherein the weather information comprises at least one atmospheric condition;
determining, by the monitoring system based upon the weather information, whether the utility meter location is associated with weather that affects communications performance; and
modifying, by the monitoring system, an acceptable communications error rate associated with the utility meter or communications interface of the utility meter from a first value to a second value upon determining that the utility meter location is associated with weather that affects communications performance, wherein modifying the acceptable communications error rate includes either (i) increasing the first value to the second value, or (ii) decreasing the first value to the second value.

13. The method of claim 12, further comprising:
determining, by the monitoring system, an actual communications error rate associated with the utility meter or the communications interface of the utility meter; and
comparing, by the monitoring system, the actual communications error rate to the acceptable communications error rate to determine whether to indicate an alarm condition for the utility meter.

14. The method of claim 12, wherein the communications error rate is associated with one or more metrics corresponding to: (i) packet loss, (ii) retransmissions, (iii) correctable bit errors, or (iv) checksum errors.

15. The method of claim 12, wherein if the weather negatively affects communications performance, then the acceptable communications error rate is increased from the first value to the second value, and
wherein if the weather positively affects communications performance, then the acceptable communications error rate is decreased from the first value to the second value.

16. The method of claim 12, wherein if the weather negatively affects communications performance, the method further includes:
restricting, by the monitoring system, communications with the utility meter to higher priority communications.

17. The method of claim 12, wherein if the weather negatively affects communications performance, the method further includes:
changing, by the monitoring system, from a first modulation method to a second modulation method for communications with the utility meter or the communications interface of the utility meter.

18. The method of claim 12, wherein the utility meter is a first utility meter, wherein the weather information is obtained from one or more of: (i) the first utility meter, (ii) a weather monitoring database or service, or (iii) one or more second utility meters located in proximity to the first utility meter.

19. The method of claim 14, wherein the packet loss error rate is associated with wireless communications with the utility meter or the communications interface of the utility meter.

20. The method of claim 16, wherein if the weather negatively affects communications performance, the method further includes queueing lower priority communications for delayed delivery to the utility meter or the communications interface of the utility meter.

* * * * *